United States Patent
Kinbara et al.

[15] 3,676,783
[45] July 11, 1972

[54] WAVEFORM DISCRIMINATING CIRCUIT

[72] Inventors: Setsuro Kinbara; Tadashi Kumahara, both of Naka-gun, Ibaragi-ken, Japan

[73] Assignee: Japan Atomic Energy Research Institute, Tokyo, Japan

[22] Filed: March 25, 1969

[21] Appl. No.: 810,223

[30] Foreign Application Priority Data

April 23, 1968 Japan..................................43/27280

[52] U.S. Cl..............................328/117, 307/235, 328/112, 328/116, 328/147
[51] Int. Cl. ......................................................H05k 5/20
[58] Field of Search..................307/235; 328/115, 116, 117, 328/112, 147

[56] References Cited

UNITED STATES PATENTS

| | | | |
|---|---|---|---|
| 3,011,128 | 11/1961 | Filipowsky | 328/117 |
| 3,133,205 | 5/1964 | Zrubek | 328/117 |
| 3,513,400 | 5/1970 | Russell | 328/147 |

*Primary Examiner*—Donald D. Forrer
*Assistant Examiner*—David M. Carter
*Attorney*—Kurt Kelman

[57] ABSTRACT

A pulse shape discriminating circuit comprising an input terminal for receiving an input signal, a plurality of characteristic circuits having their inputs connected in common to said input terminal, first and second amplitude discriminating circuits each receiving shaped pulses from the characteristic circuits associated therewith, and a mixing circuit for combining the pulses from said first and second amplitude discriminating circuits. The first amplitude discriminating circuit generates a first step pulse representative of the time which corresponds to a first point on said input signal, said first point having a value equal to a first preselected percentage of the peak value of said input signal, the second amplitude discriminating circuit generates a second step pulse representative of the time which corresponds to a second point on said input signal, said second point having a value equal to a second preselected percentage of the peak value of said input signal, and the mixing circuit generates a rectangular pulse waveform having width equal to the time interval between said first and second points.

4 Claims, 8 Drawing Figures

Fig. 1
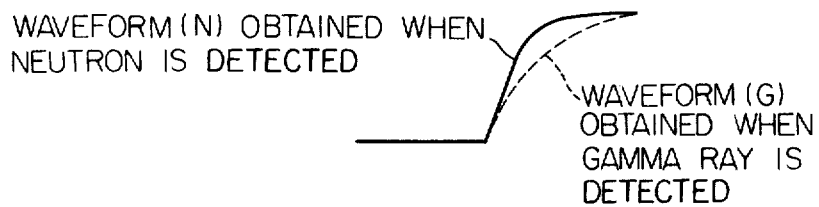
Fig. 2
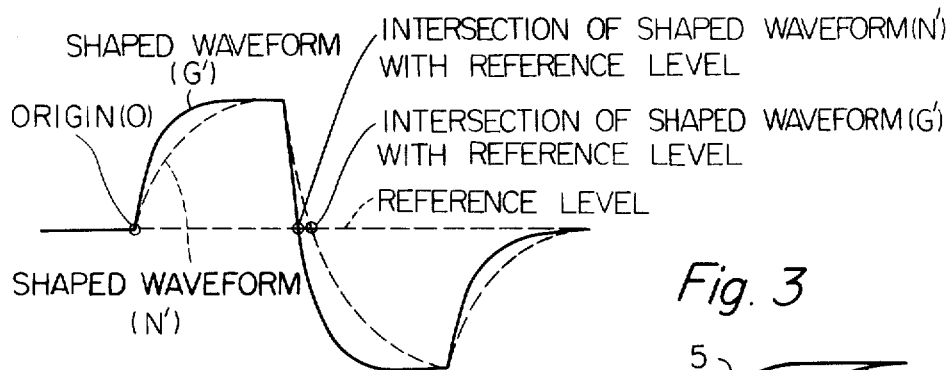
Fig. 3
Fig. 4
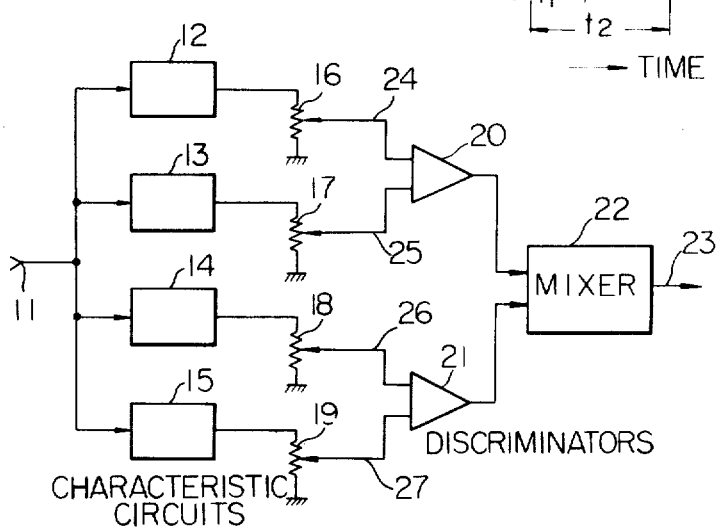

INVENTORS
JETSURO KINBARA
TADASHI KUMAHARA
BY
AGENT

WAVEFORM DISCRIMINATING CIRCUIT

BACKGROUND OF THE INVENTION

This invention relates generally to a pulse shape discriminating circuit, and more particularly to a pulse shape discriminating circuit suitable for use in the field of the measurement of pulses from radiation detectors.

It is known that pulse shapes obtained at the output of a radiation detector vary depending on the kind of particles incident on the radiation detector and the position in the radiation detector at which a reaction is caused by the incident particles. For example, in using a radiation detector, such as a scintillation counter, a proportional counter or a semiconductor detector, when the construction of the sensing unit of the detector which receives radiations, the material forming the sensing unit and the method of using the sensing unit, etc. are selected appropriately, the pulse shapes obtained at the output terminal of the detector vary depending on the kind of incident particles and the position in the detector at which a reaction is caused by the incident particles. In a well known method of measuring pulses obtained from a radiation detector, the current from the radiation detector is integrated so as to produce a voltage waveform corresponding to the detected radiation. When a neutron is detected, a voltage waveform (N) having a relatively fast rise-time is produced, and when a particle of gamma ray is sensed, a voltage waveform (G) having a relatively slow rise-time is produced (FIG. 1). Voltage waveforms actually obtained are distributed statistically above and below waveforms (N) and (G) due to fluctuations caused by the varying relative position of the incident particles to the radiation detector.

To discriminate between the shape of the pulses obtained from the radiation detector is, after all, to discriminate between the rise-time of waveform (N) and the rise-time of waveform (G). However, since the peak values or the pulse-heights of the pulses obtained from the radiation detector vary over a wide range in proportion to the energy of the incoming incident radiation and such variations occurs randomly, it is very difficult to obtain accurate pulse shape discrimination of the pulses from a radiation detector. So, in the prior art various complicated methods have been employed to measure the rise-time of each of the pulses from the radiation detector independently of the height of the pulse. One such known method comprises applying each of said waveforms (N) and (G) individually to a differentiating circuit to obtain a value $X_n$ which is proportional to the slope of the initial portion of that waveform, and then obtaining the ratio of said value $X_n$ to the peak value $X_m$ of the related waveform, in order to derive a value proportional to the rise-time of that waveform. The technique for implementing this known method includes a circuit for converting said value $X_n$ and said peak value $X_n$ from their natural form to their logarithmic form, (i.e. log $X_n$ and log $X_m$) finding the difference between these logarithmic values (i.e. log $X_n$ – log $X_m$ = log $X_n/X_m$), and means for restoring the remainder log $X_n/X_m$ into its natural form, i.e., $X_n/X_m$ to find the ratio of said value $X_n$ to said peak value $X_m$. This known technique suffers from the disadvantage that, not only is the construction of the circuit very complicated, but fine adjustment thereof is also required in use.

In another known method, the waveforms (N) and (G) are passed through a double delay line shaping circuit to produce bipolar, shaped pulse waveforms (N') and (G') (FIG. 2). In this method, when there is a difference in rise-time between the waveforms (N') and (G') at the initial portions thereof, these waveforms cross over the reference level at different points, or in other words, a time difference is created between the intersections of the shaped waveforms (N') and (G') with the reference level. This time difference is measured, considering the original point (o) of the waveforms (N') and (G') as an origin of time. The original point (o) is found beforehand by another means, and the detection of this original point (o) is not easy because the amplitude of this pulse varies over a wide range. Furthermore, in this method, the points on the waveforms (N') and (G') between which the time difference is determined are restricted to intermediate points on the falling portions of these waveforms, so there is the disadvantage that these intermediate points are not necessarily the most appropriate points for determining the rise-time of the waveforms.

Similar methods other than those described above are known, however, all of them suffer from the disadvantage that a complicated circuit arrangement is required and that adjustment of the circuit is not easy.

SUMMARY OF THE INVENTION

This invention relates to a pulse shape discriminating circuit which eliminates the foregoing prior art disadvantages and which improves, in many respects, upon known pulse shape discriminating circuits. In this invention there are employed a plurality of characteristic circuits each defined by having some characteristic such as delay, attenuation, integration, or differentiation, etc., which have their input ends connected in common to an input terminal and two amplitude discriminating circuits having characteristic circuits associated therewith. The characteristic circuits associated with one amplitude discriminating circuit are selected to have different characteristics so as to cause the amplitude discriminating circuit to produce a step pulse representative of the time corresponding to a point on the signal applied to the input terminal which has as its value a first preselected percentage, for example 10 percent of the peak value of the input signal, independent of the amplitude of the input waveform, and the characteristic circuits associated with the other amplitude discriminating circuit are also selected to have different characteristics so as to cause the second amplitude discriminating circuit to produce another step pulse representative of the time corresponding to another point on the same input signal which has as its value a second preselected percentage, for example 9 percent of the peak value of the input signal, independent of the amplitude of the input waveform. In accordance with the invention, the rise-time of the input signal can be measured as the time interval between said two points directly from the leading edge of the input signal, as a result of which the circuit is considerably simplified. In accordance with another aspect of the invention, means are provided to maintain the reference level of each of said amplitude discriminating circuits constant, whereby pulse shape measurements with very high accuracy can be performed.

The above and other objectives of the invention will become apparent from the following description taken in conjunction with the drawings.

BRIEF DESCRIPTION OF THE DRAWINGS

FIG. 1 shows examples of pulse shapes obtained for two kinds of radiations.

FIG. 2 shows examples of waveforms obtained by a conventional technic in which detector output pulses are shaped by means of a double delay line shaping circuit for attaining discrimination of the rise-time difference between the two unipolar pulses shown in FIG. 1.

FIG. 3 shows points on the rising portions of two input pulses which are detected in accordance with the invention to measure the rise-time of these input pulses.

FIG. 4 is a block diagram of one illustrative embodiment of the invention.

DETAILED DESCRIPTION OF THE PREFERRED EMBODIMENT

Figure 6:
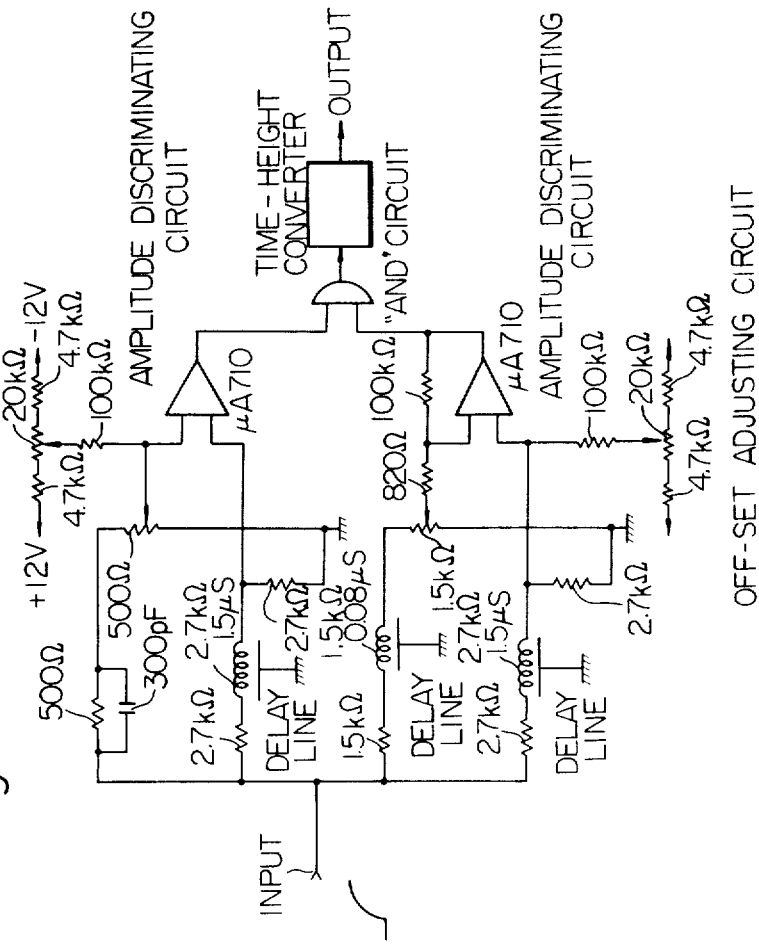
FIG. 6 shows a detailed circuit diagram embodiment of the pulse shape discriminating circuit constructed according to the embodiments of FIG. 4.

FIG. 3 shows the points 3, 4, 5 and 6 on the rising portions or leading edges of two pulses 1 and 2 having different risetimes which are detected, in accordance with the invention, by determining the rise-time of each of these waveforms. First, the point 3 or the point 4 is detected, said points having a value which is a first preselected percentage, for example, 10 percent, of the peak value of the related pulse waveform, and then the point 5 or the point 6 is detected, said points having a value which is a second preselected percentage, for example, 90 percent, of the peak value of the related pulse waveform. Thus, in accordance with the invention, the time interval ($t_1$) or ($t_2$) between the points 3 and 5 or between the points 4 and 6, respectively, is measured for each of the waveforms 1 and 2 for the purpose of measuring the rise-time of each of the pulse waveforms 1 and 2 to attain pulse-shape discrimination. Heretofore, a method like this in which the rise-time is measured directly on the pulse has not been practical for the reason that it is difficult to maintain the relative level of each pulse constant at each of the firstly positioned detecting points 3 or 4 and the secondly positioned detecting points 5 or 6 since the peak value or the pulse-height of radiation pulses vary randomly and over a wide range.

This invention realized a pulse-shape discriminating circuit by which the rise-time is measured directly on the waveform, by the circuit arrangement described below.

Figure 5:
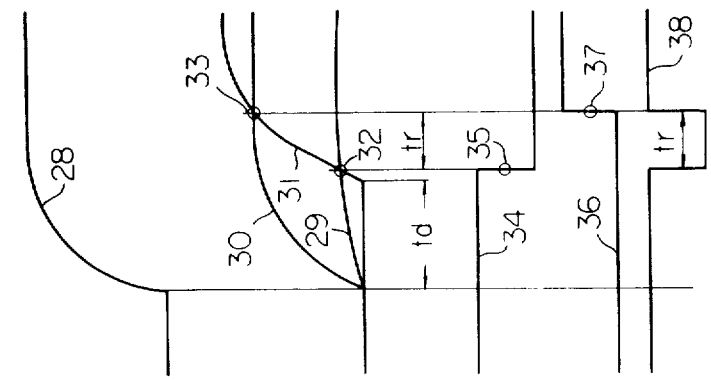
FIG. 5 shows waveforms obtained at various points in the circuit shown in FIG. 4.

Referring to FIGS. 4 and 5, an input pulse 28 applied to an input terminal 11 is simultaneously fed to characteristic circuits 12, 13, 14 and 15 and then to voltage dividing resistors 16, 17, 18 and 19, respectively. The divided pulse appearing at output terminal 24 of the resistor 16 is fed to one input of an amplitude discriminating circuit 20, and the divided pulse appearing at the output terminal 25 of resistor 17 is fed to an other input of the amplitude discriminating circuit 20. The divided pulse appearing at the output terminal 26 of the resistor 18 is fed to one input of another amplitude discriminating circuit 21, and the divided pulse appearing at the output terminal 27 of the resistor 19 is fed to another input of the amplitude discriminating circuit 21. The outputs pulses from the amplitude discriminating circuits 20 and 21 are applied to a mixing circuit 22 and a final output pulse is obtained at the output terminal 23 thereof. "A characteristic circuit" described herein means a circuit having some characteristic such as, differentiating, stretching, integrating, delaying, attenuating characteristics, or appropriate combination thereof. As seen in FIG. 4, the characteristic circuits 12 and 13 and the dividing resistors 16 and 17, together with the amplitude discriminating circuit 20, form a first signal channel, and the characteristic circuits 14 and 15 and the dividing resistors 18 and 19, together with the amplitude discriminating circuit 21, form a second signal channel. Two characteristic circuits in each channel, for example, the characteristic circuits 12 and 13, or the characteristic circuits 14 and 15, are selected so that they have different time-response characteristics and different circuits parameters. For example, the characteristic circuit 12 is selected to have simply an attenuating characteristic, and in this case a pulse shown as waveform 29 in FIG. 5 is obtained at the output terminal 24 of the dividing resistor 16. The characteristic circuit 13 is selected to have, for example, a delaying characteristic to delay the input pulse 28 by time td, and in this case a pulse shown as waveform 31 is obtained at the output terminal 25 of the dividing resistor 17. The pulses shown respectively as waveforms 29 and 31 are applied to the input terminals of the amplitude discriminating circuit 20 to compare the amplitudes of the pulses with each other so that a step pulse shown as waveform 34 is produced at the output of the discriminating circuit 20. The time 35 at which the step pulse 34 changes its level corresponds with the time at which the amplitudes of the waveforms 29 and 31 applied to the amplitude discriminating circuit 20 become equal so that they intersect at point 32. The characteristic circuit 14 belonging to another amplitude discriminating circuit 21 is selected to have, for example, simply an attenuating characteristic which is different from that of the circuit 12, and a pulse shown as waveform 30 is obtained at the output terminal 26 of the dividing resistor 18. The characteristic circuit 15 is selected to have, for example, a delaying characteristic to delay the input pulse 28 by time (td), and at the output terminal 27 of the dividing resistor 19 a pulse shown as waveform 31 is obtained which is the same as that obtained at the output terminal 25 of the resistor 17. The pulses shown respectively as waveforms 30 and 31 are applied to the input terminals of the amplitude discriminating circuit 21 so that a step pulse shown as waveform 36 is produced at the output terminal of the amplitude discriminating circuit 21. The time 37 at which the step pulse 36 changes its level corresponds with the time at which the amplitudes of the two pulses 30 and 31 become equal so that they intersect at point 33. The pulses 34 and 36 from the amplitude discriminating circuits 20 and 21 are combined in the mixing circuit 22. If the mixing circuit 22 consists of an "and" circuit which produces a "off" signal at its output only when "off" signals are applied concurrently to both of its two terminals, a rectangular pulse shown as waveform 38 is obtained at the output terminal of the mixing circuit. The width (tr) of this pulse 38 corresponds with the time interval between the intersections 33 and 32 and thus the rise-time of the waveform 31 can be measured. Because the waveform 31 is one which is formed by delaying the input pulse 28 precisely by the time interval (td), the pulse width of the waveform 38 has a value proportional to the rise-time of the input pulse 28. The construction of the mixing circuit 22 is not restricted to that described above, and various known circuits which can be applied to detect the time interval between the waveform portions 35 and 37 may be employed. When the characteristic of each circuit configuration and circuit parameters are selected as described above, the reference levels of each pair of pulses applied to the inputs of each of the amplitude discriminating circuit 20 and 21 are made equal, and the absolute value of the amplitude of each of these pulses applied to these amplitude discriminating circuits is made proportional to the amplitude of the pulse applied to the input terminal 11. Thus, even if the amplitude of the pulse applied to the input terminal 11 varies, the relative relation between the waveforms applied to the inputs of each amplitude discriminating circuit does not vary. For example, if the amplitude of the pulse applied to the input terminal 11 is doubled, then the amplitudes of both the waveforms 29 and 31 will be doubled, so that the intersection 32 occurs at the same time instant as it does before the amplitude of the input pulse waveform is doubled. Thus, even if the amplitude of the input pulse varies, the time point at which the amplitude discriminating circuit 20 and 21 are activated respectively, i.e., the horizontal position of the intersections 32 and 33 is not changed, and the time interval between these timing points instants, which represents the rise-time of the input pulse, can be measured independently of variations in the amplitude of the input pulse. The rectangular pulse obtained at the output terminal 23 of the mixing circuit 22 is, after being passed through appropriate subsequent processing means, such as, a pulse width discriminating circuit, a width-to-pulse height converter, or a width-to-clock pulse converter, utilized for its intended purpose.

The selection of the characteristic of each of the characteristic circuits 12, 13, 14 and 15 and the setting of the value of each of the voltage dividing resistors 16, 17, 18 and 19 are determined depending on the condition of the input pulse for which the measurement is to be made, and when rise-time of such input pulse is as shown in FIG. 5 is measured under a condition substantially corresponding to the definition of generally defined rise-time (time period during which the amplitude increases from 10 to 90 percent of the peak value), the characteristics of the characteristic circuits and the circuit parameters, as well as the amplitude gain of the voltage dividing resistors, are selected in such a manner that the waveforms 29, 30 and 31 shown in FIG. 5 are obtained.

As described previously the characteristics which can be applied to the circuits 12, 13, 14 and 15, are a differentiating characteristic, an integrating characteristic, a stretching characteristic, a delaying characteristic, an attenuating characteristic, and combinations thereof, and in addition a complicated characteristic including an active element, which can be selected arbitrarily in accordance with the intended purpose. The following requisites, however, should be staisfied: two characteristic circuits, e.g., 12 and 13 belonging to one amplitude discriminating circuit, e.g., circuit 20, must have different characteristics, circuit parameters, and amplitude gains: the direct current levels of the outputs from two characteristic circuits, e.g., 12 and 13, belonging to one amplitude discriminating circuit, e.g., circuit 20, must have the same reference level: Each characteristic circuit must operate linearly about both sides of said reference level and be free of nonlinearities caused by shifting of the direct current level or superposition of logic pulses having no relation to the input pulse.

When measurement of the rise-time is intended, it is sufficient generally to use the combination of a delaying characteristic and an attenuating characteristic as the characteristic circuits, as described previously, but in some cases it may be advantageous to emphasize or deemphasize the input pulse shape partially for the purpose of attaining a more perfect pulse-shape discrimination, or to add the various characteristics mentioned above as subcharacteristics to these delaying and attenuating characteristics for the purpose of increasing the measuring range or improving the linearity.

FIG. 6 is a schematic diagram showing in detail a exemplary pulse-shape discriminating circuit according to the invention. With this circuit, a pulse shape having a rise-time of from 50 nanoseconds to 10 microseconds can be measured for input pulses having amplitudes in the range of from 0.2 to 10 volts. 50 10

Figure 7:
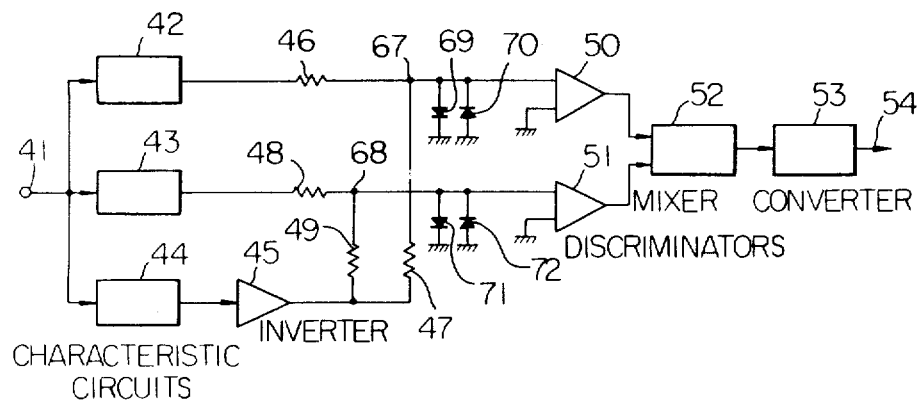
FIG. 7 is a block diagram of another embodiment of the invention.
Figure 8:
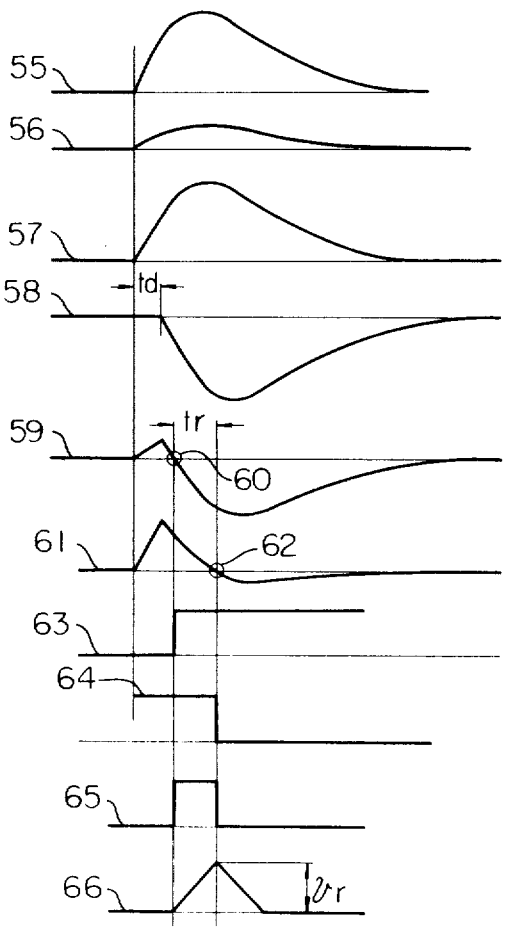
FIG. 8 shows waveforms obtained at various points in the circuit shown in FIG. 7.

FIG. 7 shows another construction of the pulse-shape discriminating circuit according to the invention, and FIG. 8 shows the waveforms appearing at various points therein.

The circuit shown in FIG. 7 has the following advantages in addition to those of the circuit shown in FIG. 4. The amplitude of the input pulse can be made larger than in the circuit of FIG. 4 without being subject to a limitations dictated by the maximum working voltage of the transistors and the integrated circuits employed therein; the amplitude of the input pulse can be made larger than in the circuit of FIG. 4 without creating any interaction between the inputs of one amplitude discriminating circuit thereby degrading the discrimination characteristic, when the amplitude of the input pulse is large; variations in the amplitude of the input pulses have no influence on the horizontal positions of the intersections 32 and 33 of the waveforms described previously from which the rise-time is determined.

Referring to FIGS. 7 and 8, an input pulse 55 applied to an input terminal 41 is fed simultaneously to characteristic circuits 42, 43 and 44. When the characteristic circuit 42 has, for example, an attenuating characteristic as well as a small differentiating characteristic, a pulse shown as waveform 56 is obtained at the output of the characteristic circuit 42. Similarly, when the characteristic circuit 43 has, for example, simply an attenuating characteristic which is different from that of the circuit 42, a pulse shown as waveform 57 is obtained at the terminal output of the characteristic circuit 43. Furthermore, when the characteristic circuit 44 has, for example, chiefly a delaying or integrating characteristic having a delaying time (td), the input pulse is delayed by time (td). The output terminal of the characteristic circuit 44 is connected to an inverter circuit 45 in which the polarity of the pulse applied thereto is inverted. Thus, a pulse shown as waveform 58 is obtained at the output of the inverter circuit 45. When the output pulse waveforms 56, 57 and 58 are combined by means of a combination of resistors 46, 47, 48 and 49 having appropriate resistances as shown in FIG. 7, pulses shown as waveforms 59 and 61 are obtained at the respective intermediate points 67 and 68 between the two sets of resistors, respectively.

These pulses 59 and 61 necessarily have the points 60 and 62 respectively at some parts of the waveforms which intersect with the base line or reference level. These intersections 60 and 62 occur in time in the same relation as do the intersections 32 and 33 shown in FIG. 5 (since the waveform 59 is the waveform 56 plus the waveform 58 and the waveform 61 is the waveform 57 plus the waveform 58.) and independently of the peak value of the input pulse. When the pulses 59 and 61 are amplitude-discriminated respectively by amplitude discriminating circuits 50 and 51, discriminated output signals shown as waveform 63 and 64 are obtained respectively at the output terminals of the discriminating circuits 50 and 51, and when these discriminated output signals are combined in mixing circuits 52 a pulse shown as pulse 65 is obtained. This pulse 65 corresponds to the waveform 38 shown in FIG. 5 except that the polarity is inverted, and the width of it is in proportion to the rise-time of the pulse applied to the input terminal 41. When the pulse 65 having width proportional to the rise-time of the input pulse is applied to a time-to-pulse height converter circuit, a final output pulse shown as waveform 66 having peak value (Vr) proportional to the rise-time of the input pulse is obtained at the output terminal 54 thereof. When an input pulse having a different rise-time is applied to the input terminal 41, output pulses having different peak values are obtained at the output terminal 54, and by discriminating the peak values of the final output pulses it is possible to attain pulse-shape discrimination.

With the circuit according to the invention, pulse-shape discrimination can be executed by measuring the rise-time directly on the leading-edge of the input pulse, so the accuracy in measurement is high, and the discrimination characteristic can easily be varied over a wide range, so that the parameters of the circuit can be altered easily, in accordance with the final purposes of measurement. Also, the circuit according to this invention is simple in construction, and low in price because the number of elements required is far less than required in the prior art. The circuit is also reliable and easy to reproduce, in comparison to the prior art. Furthermore, the circuit according to this invention has a very wide measuring range, and can be used to make measurement of pulse shapes having rise-times ranging from 50 nanoseconds to 10 microseconds and amplitudes ranging in from 0.2 to 10 volts. In addition to these advantages, with the circuit shown in FIG. 7, the operating level of each of the amplitude discriminating circuits 50 and 51 can be restricted to a constant level, such as ground, so it is possible to handle input pulses having larger amplitude by the utilization of limiter diodes 69, 70, 71 and 72 connected to the input terminals of the amplitude discriminating circuits. Furthermore, in the circuit of FIG. 7, interaction between the inputs of each of the amplitude discriminating circuits can be minimized so that the accuracy of the discriminating operation is increased since means are provided which easily limit the amplitude of the pulses applied to the amplitude discriminating circuits. Furthermore, the constant operating levels of the amplitude discriminating circuits 50 and 51 result in the simplification of the entire circuit.

Though this invention is described with reference to the detection of two points on the leading edge of an input pulse to measure the rise-time, it should be understood that it is not intended to limit the invention only to the illustrated embodiments. For example, the points to be detected on the input pulse can be selected arbitrarily. In some cases, the circuit may be used to measure the fall-time of an input pulse waveform, or to measure the ratio of the rise-time to the fall-time of the input pulse. Furthermore, by increasing the number of pairs of the amplitude discriminating circuits and selecting a number of points to be detected on the leading edge of the input pulse so that a plurality of sections of the pulse defined by these points are measured simultaneously by these discriminating circuits, a pulse-shape discrimination can be attained with higher accuracy.

Furthermore, in the circuit of FIG. 7, by selecting appropriately the characteristics applied to the circuits 42, 43 and 44 and the circuit parameters so that the waveforms applied to the amplitude discriminating circuit 50 and 51 are partially emphasized or deemphasized, measurement under various conditions can be performed. Also, it is possible to set the intersection 62 on waveform 61 at a position later in time than the occurrence of the peak of the waveform 58, by selecting the delay time of the characteristic circuit 44 appropriately and simultaneously emphasizing the integrating characteristic thereof along with appropriate adjustment of the amplitude gain. The diode 69, 70, 71 and 72 connected to the input of the amplitude discriminating circuits 50 and 51 as the amplitude limiter circuits may be replaced by other similar elements which are known in the art.

What is claimed is:

1. A pulse-shape discriminating circuit comprising an input terminal for receiving an input signal, first and second signal channel means having their input ends connected in common to said input terminal, said first signal channel means producing a first shaped pulse representative of a time interval corresponding to a first point on said input signal, said first point having an amplitude which is a first predetermined percentage of the peak value of said input signal, the first signal channel means comprising first and second characteristic circuits having their input ends connected in common to said input terminal and producing at their output ends signals each having a magnitude proportional to the magnitude of said input signal, first and second dividing resistors each connected in series to said first and second characteristic circuits, and a first amplitude discriminating circuit having input ends connected respectively to taps on said first and second resistors, said first and second characteristic circuits having different electrical characteristics, said second signal channel means producing a second shaped pulse representative of a time interval corresponding to a second point on said input signal, said second point having an amplitude which is a second predetermined percentage of the peak value of said input signal, the second signal channel means comprises third and fourth characteristic circuits having their input ends connected in common to said input terminal and producing at their output ends signals each having a magnitude proportional to the magnitude of said input signal, third and fourth dividing resistors each connected in series to said third and fourth characteristic circuits, and a second amplitude discriminating circuit having input ends connected respectively to taps on said third and fourth resistors, said third and fourth characteristic circuits having different electrical characteristics, each of said characteristic circuits being defined as a circuit having an electrical characteristic selected from a delaying, an attenuating, a differentiating, an integrating, and a stretching effect or appropriate combination thereof; and means for combining said first and second shaped pulses to produce an output pulse representative of the time interval between said first and second points.

2. A pulse-shape discriminating circuit comprising an input terminal for receiving an input signal, first and second signal channel means having their input ends connected in common to said input terminal, said first signal channel means producing a first shaped pulse representative of a time interval corresponding to a first point on said input signal, said first point having an amplitude which is a first predetermined percentage of the peak value of said input signal, and the first signal channel means including a first characteristic circuit, said second signal channel means producing a second shaped pulse representative of a time interval corresponding to a second point on said input signal, said second point having an amplitude which is a second predetermined percentage of the peak value of said input signal, and the second signal channel means including a second characteristic circuit, the first and second signal channel means including a third characteristic circuit in common to both of them; and the pulse-shape discriminating circuit further including inverter means connected in series to said third characteristic circuit, two pairs of dividing circuits each consisting of two resistors and having first and second intermediate junctions therebetween respectively, one end of each of said dividing circuits being connected in common to a junction to which said inverter means is connected, the other ends of said divider circuits being connected respectively to said first and second characteristic circuits, first and second amplitude limiting circuits connected respectively to said first and second junctions, and first and second amplitude discriminating circuits each having one input end connected respectively to said first and second junctions and the other input end connected respectively to a reference level; and means for combining said first and second shaped pulses to produce an output pulse representative of the time interval between said first and second points.

3. A pulse-shape discriminating circuit as set forth in claim 1 wherein the first characteristic circuit has an attenuating characteristic, the second characteristic circuit has a delaying characteristic, the third characteristic circuit has an attenuating characteristic different from that of said first characteristic circuit, and the fourth characteristic circuit has a delaying characteristic similar to that of said second characteristic circuit, and wherein the means for combining the first and second shaped pulses comprises of a mixer providing a rectangular pulse waveforms having width representative of the risetime of the input pulse.

4. A pulse-shape discriminating circuit as set forth in claim 2 wherein a width-to-pulse height converter is connected to said means for combining the first and second shaped pulses, whereby an output pulse having a height proportional to the rise-time of said input signal is produced at the output terminal of the converter.

* * * * *

UNITED STATES PATENT OFFICE
CERTIFICATE OF CORRECTION

Patent No. 3,676,783　　　　　　　　　　Dated　July 11, 1972

Inventor(s)　Setsuro Kinbara et al

It is certified that error appears in the above-identified patent and that said Letters Patent are hereby corrected as shown below:

In Col. 1, at (30), change "43/27280" to --43/27250--

Signed and sealed this 6th day of March 1973.

(SEAL)
Attest:

EDWARD M. FLETCHER, JR.　　　　　ROBERT GOTTSCHALK
Attesting Officer　　　　　　　　　Commissioner of Patents